US012153364B2

(12) United States Patent
Endo

(10) Patent No.: US 12,153,364 B2
(45) Date of Patent: Nov. 26, 2024

(54) HEATING DEVICE, FIXING DEVICE, AND IMAGE PROCESSING APPARATUS

(71) Applicant: Toshiba Tec Kabushiki Kaisha, Tokyo (JP)

(72) Inventor: Sasuke Endo, Chigasaki Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/346,501

(22) Filed: Jul. 3, 2023

(65) Prior Publication Data

US 2023/0350327 A1 Nov. 2, 2023

Related U.S. Application Data

(63) Continuation of application No. 17/855,824, filed on Jul. 1, 2022, now Pat. No. 11,733,627, which is a continuation of application No. 17/313,821, filed on May 6, 2021, now abandoned.

(30) Foreign Application Priority Data

Aug. 6, 2020 (JP) ................................ 2020-133915

(51) Int. Cl.
*G03G 15/20* (2006.01)

(52) U.S. Cl.
CPC ................................ *G03G 15/2039* (2013.01)

(58) Field of Classification Search
CPC .................................................. G03G 15/2039
See application file for complete search history.

(56) References Cited

U.S. PATENT DOCUMENTS

| | | | |
|---|---|---|---|
| 9,639,043 B1 | 5/2017 | Kimura et al. |
| 2007/0217805 A1 | 9/2007 | Inoue et al. |
| 2010/0260508 A1 | 10/2010 | Iwamoto |
| 2012/0076521 A1 | 3/2012 | Ishihara et al. |

(Continued)

FOREIGN PATENT DOCUMENTS

| | | |
|---|---|---|
| JP | 2011069880 A | 4/2011 |
| JP | 2017-049618 A | 3/2017 |

(Continued)

OTHER PUBLICATIONS

Notice of Reasons for Refusal mailed Feb. 6, 2024 in corresponding Japanese Patent Application No. 2020-133915, 10 pages (with Translation).

*Primary Examiner* — Stephanie E Bloss
*Assistant Examiner* — Michael A Harrison
(74) *Attorney, Agent, or Firm* — Kim & Stewart LLP

(57) ABSTRACT

A heating device for heating a medium on which an image can be formed includes a cylindrical belt, a first heating unit, and a second heating unit. The first and second heating units are inside the cylindrical belt and face an inner circumferential surface of the belt. A controller is configured to control the heating units to generate heat. When the medium is to be heated to reach an image fixing temperature at which the image can be fixed to the medium, the controller controls the first and second heating units to both generate heat. After the medium is heated to the image fixing temperature, the controllers control the first heating unit to generate heat, but not the second heating unit.

20 Claims, 7 Drawing Sheets

(56) References Cited

U.S. PATENT DOCUMENTS

| | | | | |
|---|---|---|---|---|
| 2015/0037052 | A1* | 2/2015 | Muramatsu | G03G 15/2042 399/334 |
| 2021/0349413 | A1* | 11/2021 | Hiramatsu | B41J 2/325 |
| 2022/0043377 | A1 | 2/2022 | Endo | |

FOREIGN PATENT DOCUMENTS

| | | | |
|---|---|---|---|
| JP | 2017157322 | A | 9/2017 |
| JP | 2018013647 | A | 1/2018 |

* cited by examiner

HEATING DEVICE, FIXING DEVICE, AND IMAGE PROCESSING APPARATUS

CROSS-REFERENCE TO RELATED APPLICATIONS

This application is a continuation of U.S. patent application Ser. No. 17/855,824, filed on Jul. 1, 2022, which is a continuation of U.S. patent application Ser. No. 17/313,821, filed on May 6, 2021, now abandoned, which is based upon and claims the benefit of priority from Japanese Patent Application No. 2020-133915, filed on Aug. 6, 2020, the entire contents of each of which are incorporated herein by reference.

FIELD

Embodiments described herein relate generally to a heating device, a fixing device, and an image processing apparatus.

BACKGROUND

An image processing apparatus includes an image forming unit, a belt, and a heating unit. The image forming unit forms an image on a sheet. The belt is formed in a cylindrical shape. The heating unit is provided inside the cylindrical shape of the belt. The heating unit thus faces an inner peripheral surface of the belt and operates to heat the belt. It is generally required to suppress the local temperature changes or variations of the belt for image forming operations.

DETAILED DESCRIPTION

In general, according to one embodiment, a heating device for heating a medium on which an image can be formed includes a cylindrical belt, a first heating unit, and a second heating unit. The first and second heating units are inside the cylindrical belt and face an inner circumferential surface of the belt. A controller is configured to control the heating units to generate heat. When the medium is to be heated to reach an image fixing temperature at which the image can be fixed to the medium, the controller controls the first and second heating units to both generate heat. After the medium is heated to the image fixing temperature, the controllers control the first heating unit to generate heat, but not the second heating unit.

Hereinafter, one or more embodiments will be described with reference to the drawings.

Figure 1:
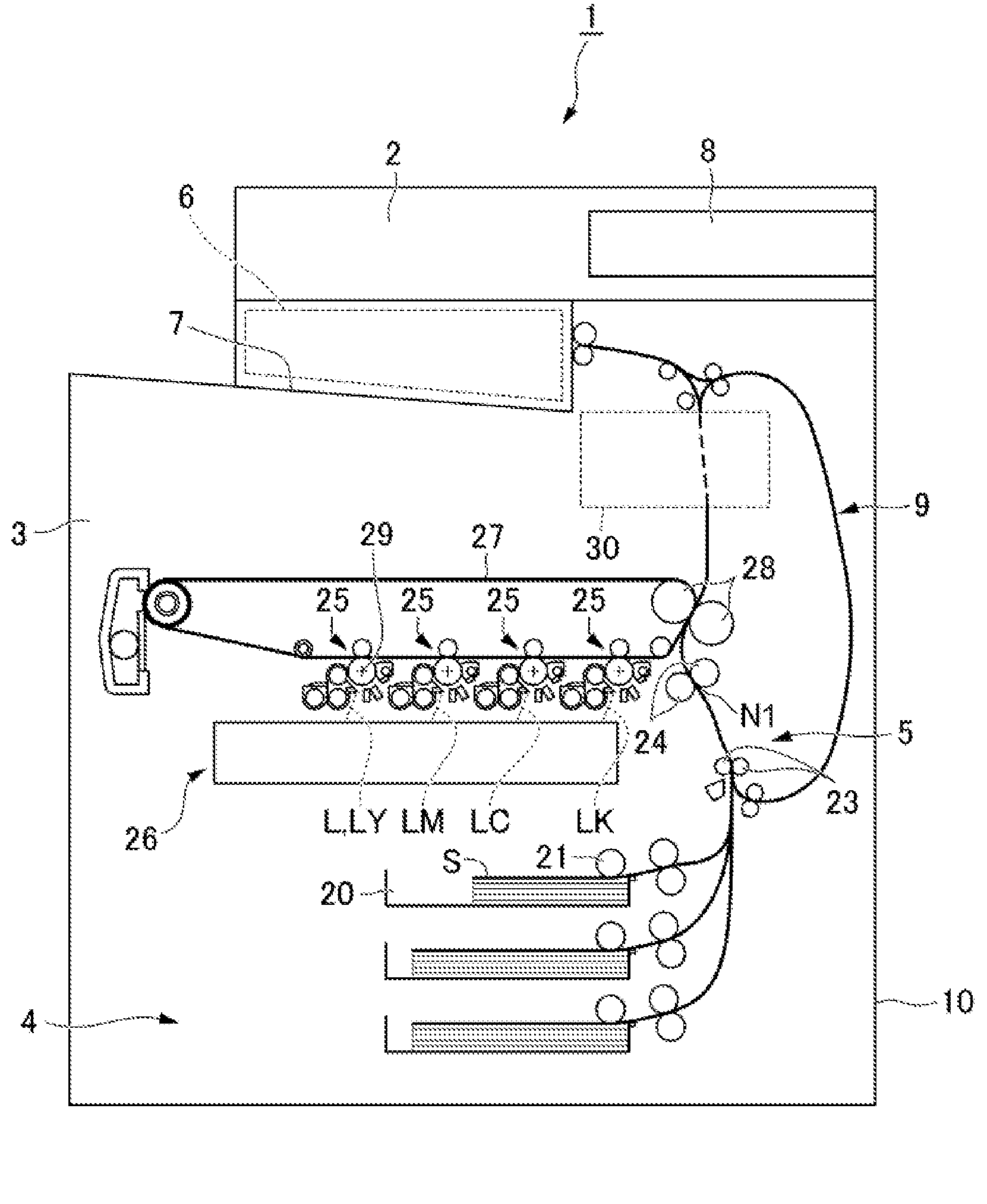
FIG. 1 is a schematic diagram of an image processing apparatus according to a first embodiment.

First, an image processing apparatus 1 according to a first embodiment will be described with reference to FIG. 1. For example, the image processing apparatus 1 is an image forming apparatus configured to form an image on a sheet of paper S. The image processing apparatus 1 includes a housing 10, a scanner unit 2, an image forming unit 3, and a heating device 30, a sheet supply unit 4, a conveyance unit 5, a discharge tray 7, a reversing unit 9, a control panel 8, and a controller 6.

The housing 10 houses various components of the image processing apparatus 1 therein. The scanner unit 2 reads an image from a sheet to be copied as a pattern of brightness and darkness of reflected light or the like and generates an image signal. The scanner unit 2 outputs the generated image signal to the image forming unit 3. The image forming unit 3 forms an image with a material such as toner based on the image signal received from the scanner unit 2 or an image signal received from an external device. The image initially formed by the image forming unit 3 is referred to as a toner image. The image forming unit 3 transfers the toner image onto the surface of the sheet S. The image forming unit 3 heats and presses the sheet S to fix the toner image to the sheet S.

The sheet supply unit 4 supplies sheets S one by one to the conveyance unit 5 in accordance with the timing at which the image forming unit 3 forms the toner image. The sheet supply unit 4 includes a sheet storage unit 20 and a pickup roller 21. The sheet storage unit 20 stores sheets S of a particular size and type. The pickup roller 21 takes out the sheets S one by one from the sheet storage unit 20. The pickup roller 21 supplies the taken-out sheet S to the conveyance unit 5.

The conveyance unit 5 conveys the sheet S from the sheet supply unit 4 to the image forming unit 3. The conveyance unit 5 includes conveyance rollers 23 and registration rollers 24. The conveyance rollers 23 convey the sheet S from the pickup roller 21 to the registration rollers 24. The conveyance rollers 23 cause the front end of the sheet S in the conveyance direction to touch (abut) against a nip N1 formed by the registration rollers 24. The registration rollers 24 serve to adjust the front end position of the sheet S in the conveyance direction at the nip N1. The registration rollers 24 convey the sheet S in accordance with the timing at which the image forming unit 3 can appropriately transfer the toner image onto the sheet S.

The image forming unit 3 includes a plurality of image drawing units 25, a laser scanning unit 26, an intermediate transfer belt 27, and a transfer unit 28. Each image drawing unit 25 includes a photosensitive drum 29. Each image drawing unit 25 forms a toner image on the respective photosensitive drum 29 according to an image signal received from the scanner unit 2 or another device. Each image forming unit 25 forms the toner image with one of yellow, magenta, cyan, and black toners.

An electrostatic charger, a developing device, and the like are disposed around each photosensitive drum 29. The electrostatic charger charges the surface of the photosensitive drum 29. Each developing device contains a developer containing one of yellow, magenta, cyan, and black toners. Each developing device develops an electrostatic latent image formed on a photosensitive drum 29. As a result, toner images of the respective colors are formed on the photosensitive drums 29.

The laser scanning unit 26 scans the charged photosensitive drums 29 with laser light L to expose the photosensitive drums 29 according to the image signal. The laser scanning unit 26 exposes the photosensitive drums 29 of the image drawing units 25 for each color with respective laser beams LY, LM, LC, LK. Thus, the laser scanning unit 26 forms an electrostatic latent image on each photosensitive drum 29.

The toner image on the surface of each photosensitive drum 29 is then transferred (primary transferred) to the intermediate transfer belt 27. The transfer unit 28 then transfers the toner images from the intermediate transfer belt 27 onto the surface of the sheet S at a secondary transfer position. The heating device 30 heats and presses the sheet S to fix the transferred toner image onto the sheet S.

The reversing unit 9 can operate to reverse the sheet S in order to form an image on the back surface of the sheet S. The reversing unit 9 reverses the sheet S discharged from the heating device 30 by a switchback or the like. The reversing unit 9 conveys the reversed sheet S back to the registration rollers 24. The sheet S on which an image has already been formed and which has been discharged can be placed on the sheet discharge tray 7.

The control panel 8 is an input unit through which an operator (user) inputs instructions or commands related to operating the image processing apparatus 1. The control panel 8 includes a touch panel and various hardware keys.

The controller 6 controls each unit of the image processing apparatus 1.

Figure 2:
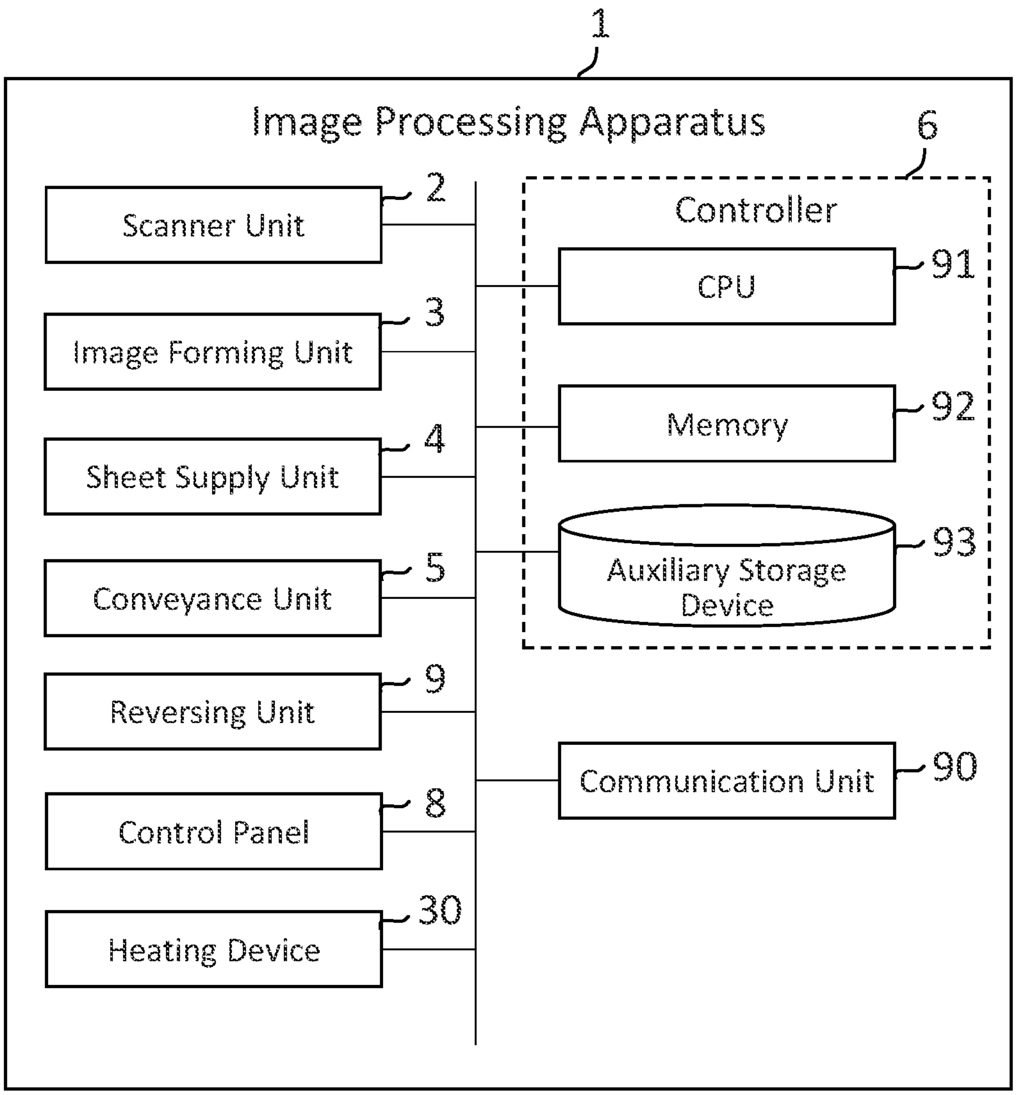
FIG. 2 is a hardware diagram of an image processing apparatus according to a first embodiment.

FIG. 2 is a hardware diagram of the image processing apparatus 1. The image processing apparatus 1 includes the controller 6 including a CPU (Central Processing Unit) 91, a memory 92, and an auxiliary storage device 93 connected via a bus or the like. The controller 6 executes one or more programs. The image processing apparatus 1 includes a scanner unit 2, an image forming unit 3, a heating device 30, a sheet supply unit 4, a conveyance unit 5, and a reversing unit 9, the control panel 8, and the communication unit 90. In one embodiment, the heating device 30 may further include a control circuit having similar functions as those described for the controller 6 or controller 6 may be considered as a part of a heating device 30 in some examples.

The CPU 91 of the controller 6 executes programs stored in the memory 92 and/or the auxiliary storage device 93. The controller 6 controls each unit of the image processing apparatus 1 according to the programs. The auxiliary storage device 93 is a storage device such as a magnetic hard disk device (HDD) or a semiconductor storage device (SSD). The auxiliary storage device 93 stores various programs and data. The communication unit 90 is a communication interface circuit to communicate with an external device.

Figure 3:
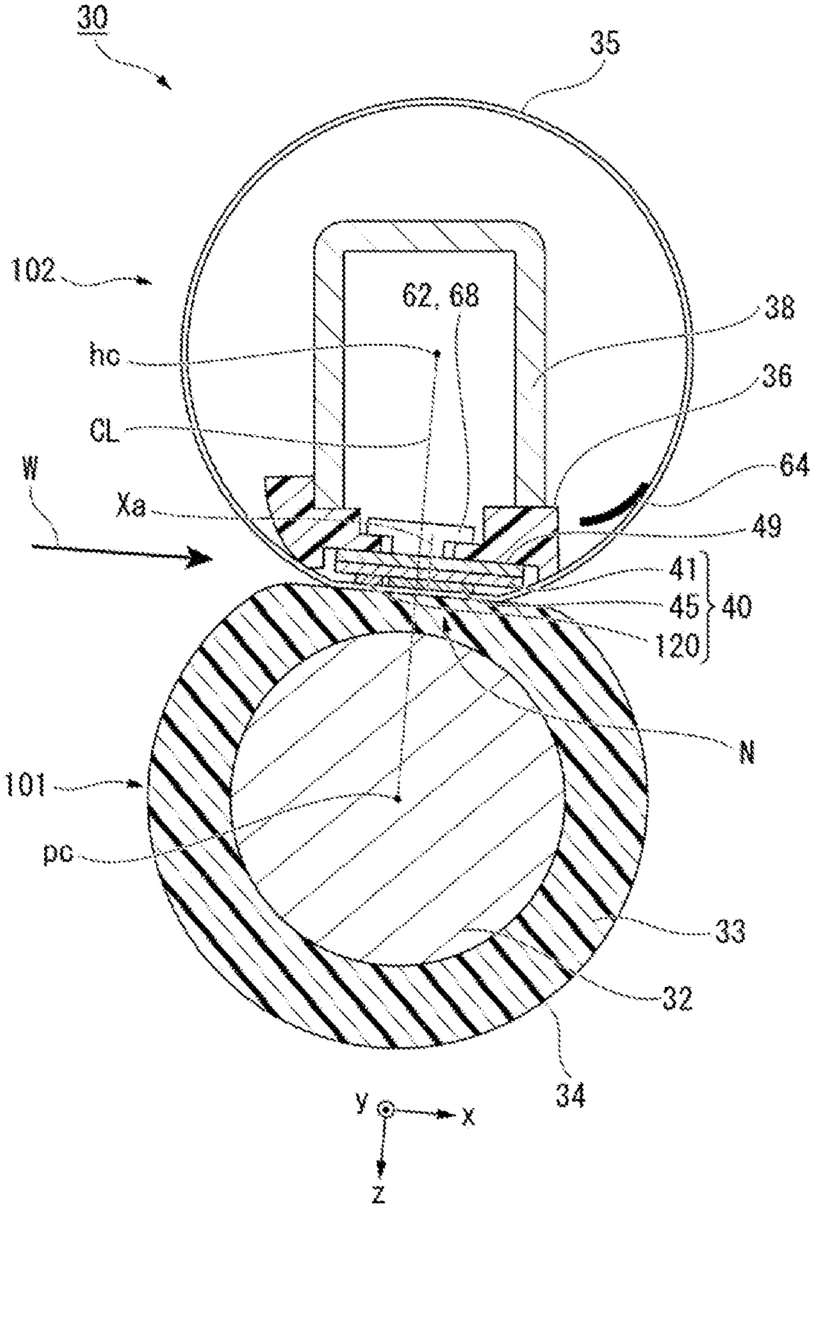
FIG. 3 is a front cross sectional view of a heating device of a first embodiment.

The heating device 30 will be described in detail. FIG. 3 is a front cross sectional view of the heating device 30. In one embodiment, the heating device 30 is a fixing device including a pressure roller 101 and a heating roller 102.

The pressure roller 101 forms a nip N with the heating roller 102. The pressure roller 101 applies pressure to the sheet S on which the toner image has been formed and that has entered the nip N. The pressure roller 101 rotates and conveys the sheet S. The pressure roller 101 includes a core metal 32, an elastic layer 33, and a release layer 34.

The core metal 32 is formed in a cylindrical shape with a metal material such as stainless steel. Both end portions of the core metal 32 in the axial direction are rotatably supported. The core metal 32 is rotationally driven by a motor. The core metal 32 contacts a cam member. The cam member rotates so that the core metal 32 is moved toward and away from the heating roller 102.

The elastic layer 33 is formed of an elastic material such as silicone rubber. The elastic layer 33 is formed on the outer peripheral surface of the core surface of the core metal 32. The release layer 34 is formed of a resin material such as PFA (tetra fluoroethylene-perfluoroalkyl vinyl ether copolymer). The release layer 34 is formed on the outer peripheral surface of the elastic layer 33.

For example, when the outer diameter of the pressure roller 101 is 20 mm to 40 mm, the outer diameter of the core metal 32 is 10 mm to 20 mm, the thickness of the elastic layer 33 is 5 mm to 20 mm, and the thickness of the release layer 34 is 20 μm to 40 μm is preferably set.

It is desirable that the hardness of the outer peripheral surface of the pressure roller 101 is 40° to 50° under a load of 9.8N on an ASKER-C hardness meter. As a result, the area of the nip N and the durability of the pressure roller 101 are ensured.

The pressure roller 101 can approach and separate from the heating roller 102 by rotation of the cam member. When the pressure roller 101 is brought close to the heating roller 102 and pressed by a pressure spring, the nip N is formed. On the other hand, when the jam of the sheet S occurs in the heating device 30, the sheet S can be removed by separating the pressure roller 101 from the heating roller 102. Further, in a state where the rotation of the belt 35 is stopped, such as during sleep, the pressure roller 101 is separated from the heating roller 102, thereby preventing the belt 35 from being plastically deformed.

The pressure roller 101 is rotated by a motor. When the pressure roller 101 rotates while the nip N is formed, the belt 35 of the heating roller 102 is driven to rotate. The pressure roller 101 conveys the sheet S in the conveyance direction W by rotating in a state in which the sheet S is disposed in the nip N.

The heating roller 102 heats the sheet S entering the nip N. The heating roller 102 includes a belt 35, a heater unit 40, a heat conduction member 49, a support member 36, a stay 38, a heater thermometer 62, a thermostat 68, and a film thermometer 64.

The belt 35 is formed in a cylindrical shape. The belt 35 includes a base layer, an elastic layer, and a release layer in this order from the inner circumferential side. The base layer is formed of a material such as nickel (Ni) and the like. The elastic layer is laminated on the outer peripheral surface of the base layer. The elastic layer is formed of an elastic material such as silicone rubber. The release layer is laminated on the outer peripheral surface of the elastic layer. The release layer is formed of a material such as PFA resin.

In order to shorten the warm-up time, it is preferable to set the thicknesses of the elastic layer and the release layer so that the heat capacities are not too large. For example, when the inner diameter of the belt 35 is 20 mm to 40 mm, the thickness of the base layer should be set to 30 μm to 50 μm, the thickness of the elastic layer should be set to 100 μm to 300 μm, and the thickness of the release layer should be set to 20 μm to 40 μm. The inner side of the base layer may be coated to improve frictional sliding properties with the heater unit 40.

Figure 4:
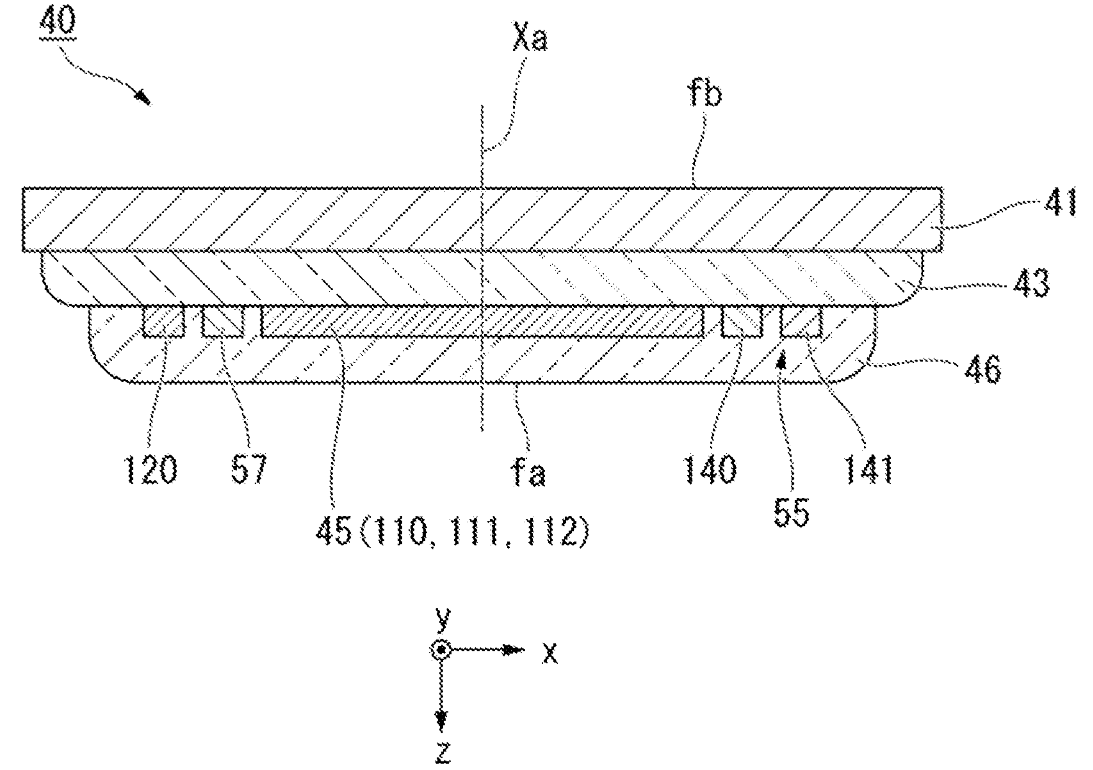
FIG. 4 is a front cross sectional view of a heater unit according to a first embodiment.
Figure 5:
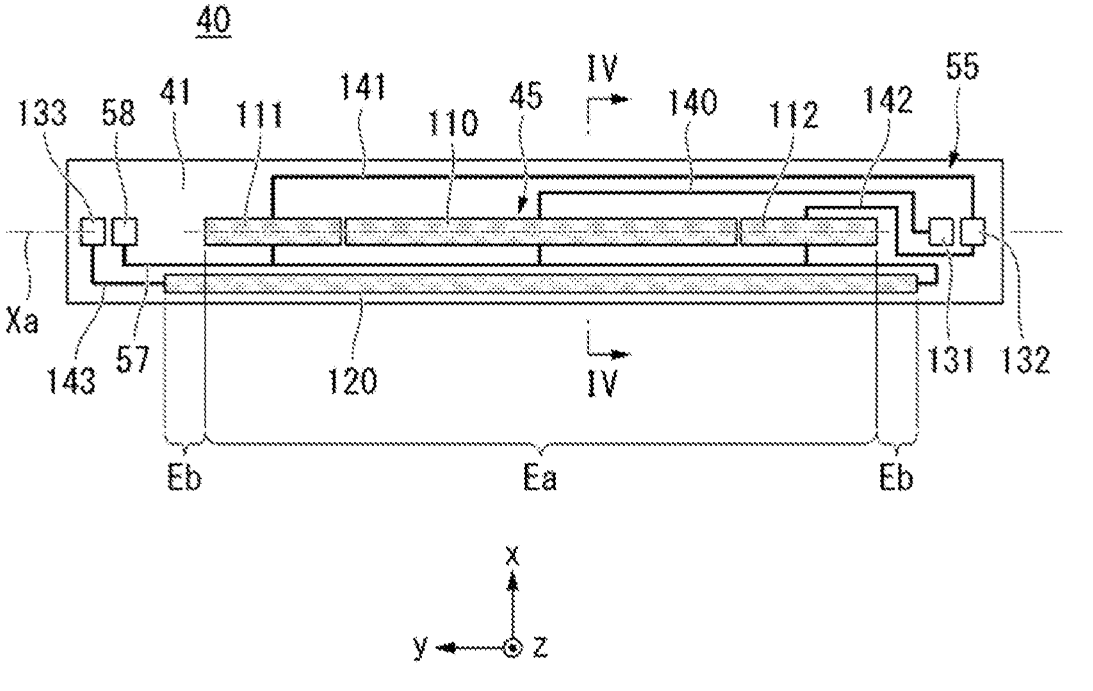
FIG. 5 is a bottom view of a heater unit according to a first embodiment.

FIG. 4 is a front cross sectional view of the heater unit 40 taken along line IV-IV in FIG. 5. FIG. 5 is a bottom view of the heater unit 40 viewed from +z direction. The heater unit 40 includes a substrate 41, a first heating unit 45, a second heating unit 120, and a wiring set 55.

The substrate 41 is formed of a metal material such as stainless steel or a ceramic material such as aluminum nitride. The substrate 41 is formed in an elongated rectangular plate shape. The substrate 41 is disposed radially inward of the belt 35. The longitudinal direction of the substrate 41 is parallel to the axial direction of the belt 35.

In this application, the x, y and z directions are defined as follows. The y direction is the longitudinal direction of the substrate 41 or the heater unit 40. The longitudinal direction is orthogonal to the conveyance direction of the sheet S. As will be described later, the +y direction is a direction from a central heating element 110 toward a first end heating element 111. The x direction is the lateral direction of the substrate 41. The +x direction is the conveyance direction or downstream direction of the sheet S. The z direction is a normal direction of the substrate 41. The +z direction is a direction in which the first heating unit 45 is disposed with respect to the substrate 41. An insulating layer 43 made of a glass material or the like is formed on the surface in the +z direction of the substrate 41. A surface fa in the +z of the heater unit 40 direction is in contact with an inner circumferential surface of the belt 35 (see FIG. 3).

The first heating unit 45 is disposed on the substrate 41. As shown in FIG. 4, the first heating unit 45 is formed on the surface in the +z direction of the insulating layer 43. The first heating unit 45 is formed of a silver-palladium alloy or the like. As shown in FIG. 5, the outer shape of the first heating unit 45 is formed in a rectangular shape having a longitudinal direction parallel to the y direction and a short direction parallel to the x direction. The first heating unit 45 generates heat in a first region Ea whose longitudinal direction is the y direction. For example, the total length of the first heating unit 45 in the y direction is set to be greater than or equal to 297 mm and less than 329 mm.

The first heating unit 45 includes a plurality of heating elements 111, 110, and 112 provided along the y direction. The first heating unit 45 includes a first end heating element 111, a central heating element 110, and a second end heating element 112 arranged in the y direction. The central heating element 110 is disposed at the center of the first heating unit 45 in the y direction. The central heating element 110 may include a plurality of small heating elements arranged side by side along the y direction. The first end heating element 111 is disposed on the +y direction side of the central heating element 110 and at an end portion of the first heating unit 45 in the +y direction. The second end heating element 112 is arranged on −y direction side of the central heating element 110 and at an end portion of the first heating unit 45 in the −y direction. A boundary line between the central heating element 110 and the first end heating element 111 is parallel to the x direction. A boundary line between the central heating element 110 and the first end heating element 111 may cross the x direction. The same applies to the boundary line between the central heating element 110 and the second end heating element 112. The first heating unit 45 generates heat by energization.

The electric resistance value of the central heating element 110 is smaller than the electric resistance values of the first end heating element 111 and the second end heating element 112. The first end heating element 111 and the second end heating element 112 have substantially the same electrical resistance value. Here, the electric resistance value of the central heating element 110 is referred to as "central resistance value A", and the electric resistance value of the first end heating element 111 or the second end heating element 112 is referred to as "end resistance value B". For example, the ratio of the central resistance value A to the end resistance value B (A:B) is preferably in the range of 1:3 to 1:7, and more preferably in the range of 1:4 to 1:6.

The sheet S which has a small width in the y direction passes through the center of the heating device 30 in the y direction. In such a case, the controller 6 causes only the central heating element 110 to generate heat. On the other hand, the controller 6 heats the whole of the first heating unit 45 when the sheet S has a large width in the y direction. Therefore, the central heating element 110 and the pair of the first end heating element 111 and the second end heating element 112 are controlled to generate heat independently of each other. The first end heating element 111 and the second end heating element 112 are similarly controlled to generate heat.

The second heating unit 120 is disposed on the substrate 41. As shown in FIG. 4, the second heating unit 120 is formed on the surface of the insulating layer 43 in +z direction. The second heating unit 120 is formed of a silver-palladium alloy or the like. The outer shape of the second heating unit 120 is formed in a rectangular shape whose longitudinal direction is parallel to the y direction and whose short direction is parallel to the x direction. The first heating unit 45 and the second heating unit 120 generate heat in different regions. The second heating unit 120 generates heat in a region including a second region Eb (see FIG. 5) outside the first heating unit 45 along the y direction. In an embodiment, the second heating unit 120 generates heat in the first region Ea and the second region Eb. For example, the total length of the second heating unit 120 in the y direction is greater than or equal to the 329 mm.

As shown in FIG. 5, the length of the second heating unit 120 in the y direction is larger than the length of the first heating unit 45 in the y direction. The second heating unit 120 is longer than the first heating unit 45 on both outer sides in the y direction. The second heating unit 120 is formed by a single heating element extending along the y direction.

The second heating unit 120 generates heat by energization. The temperature coefficient of resistance for the first heating unit 45 and the temperature coefficient of resistance for the second heating unit 120 are different from each other. In the present example, the temperature coefficient of resistance for the second heating unit 120 is less than the temperature coefficient of resistance for the first heating unit 45.

For example, the first heating unit 45 and the second heating unit 120 may be formed of different heating elements. For example, a heating element may include a "TCR material," which in this context is a material having a large temperature coefficient of resistance (TCR). When the heating element includes a TCR material, the electric power used by the heating element decreases as the temperature of the heating element increases.

Specifically, as the temperature of the heating element rises, the electric power changes as expressed by the following equation (1):

$$P=Pa/\{1+(\alpha TCR/106)\times(T-Ta)\}$$

In the equation (1), P indicates an electric power output in watts (W) required at a particular temperature, Pa indicates an electric output in watts (W) required at a reference temperature T indicates the particular temperature in ° C., Ta indicates a reference temperature in ° C., and αTCR indicates a temperature coefficient for resistance change in parts per million (ppm).

Since the heating element includes a TCR material, power consumption can be reduced, and a temperature rise of the non-sheet passing portion can be alleviated. On the other hand, the time required for heating the heating device 30 at start up from a low temperature may increase.

As described above, the temperature coefficient of resistance of the second heating unit 120 is smaller than the temperature coefficient of resistance of the first heating unit 45. Therefore, when the temperature of the heater unit 40 is increased, the decrease of the electric power for the second heating unit 120 is smaller than the decrease of the electric power for the first heating unit 45. Therefore, it is possible to shorten the time required for heating during the start-up of the heating device 30.

The wiring set 55 can be formed of a metal material such as silver. As shown in FIG. 5, the wiring set 55 includes a central contact 131, a central wiring 140, an end contact 132, a first end wiring 141, a second end wiring 142, an auxiliary contact 133, an auxiliary wiring 143, a common contact 58, and a common wiring 57.

The central contact 131 is disposed on the −y direction side of the first heating unit 45. The central wiring 140 is disposed on the +x direction side of the first heating unit 45. The central wiring 140 connects the side of the central heating element 110 in the +x direction and the central contact 131.

The end contacts 132 are disposed on the −y direction side of the central contact 131. The first end wiring 141 is disposed on the +x direction side of the first heating unit 45 and on the +x direction side of the central wiring 140. The first end wiring 141 connects the side of the first end heating element 111 in the +x direction and the end of the end contact 132 in the +x direction. The second end wiring 142 is disposed on the +x direction side of the first heating unit 45 and on the −x direction side of the central wiring 140. The second end wiring 142 connects the side of the second end heating element 112 in the +x direction and the end of the end contact 132 in the −x direction.

The auxiliary contact 133 is disposed on the +y direction side of the common contact 58. The auxiliary wiring 143 is disposed on the +y direction of the second heating unit 120. The auxiliary wiring 143 is arranged on the −x direction side of the first heating unit 45 and on the −x direction side of the common wiring 57. The auxiliary wiring 143 connects the end portion of the second heating unit 120 in the +y direction and the end portion of the auxiliary contact 133 in the −x direction.

The common contact 58 is disposed on the +y direction side of the first heating unit 45. The common wiring 57 is disposed on the −x direction side of the first heating unit 45 and on the +x direction side of the second heating unit 120. The common wiring 57 connects the sides in the −x direction of the central heating element 110, the first end heating element 111, and the second end heating element 112, the end portion of the second heating unit 120 in the −y direction, and the common contact 58.

As shown in FIG. 3, a straight line CL connecting the center pc of the pressure roller 101 and the center hc of the heating roller 102 is defined. The center Xa of the substrate 41 in the x direction is located on the +x direction side of the straight line CL. Accordingly, since the substrate 41 extends along the +x direction of the nip N, the sheet S passing through the nip N is easily separated from the heating roller 102.

As shown in FIG. 4, the first heating unit 45, the second heating unit 120, and the wiring set 55 are formed on the surface of the insulating layer 43 in the +z direction. A protective layer 46 is formed of a glass material or the like so as to cover the first heating unit 45, the second heating unit 120, and the wiring set 55. The protective layer 46 protects the first heating unit 45, the second heating unit 120, and the wiring set 55. The protective layer 46 improves the slidability between the heater unit 40 and the belt 35.

As shown in FIG. 3, the heater unit 40 is disposed inside the belt 35. Grease is applied to the inner peripheral surface of the belt 35. The heater unit 40 is in contact with the inner circumferential surface of the belt 35 via the grease. Specifically, the grease is applied between the first surface fa (see FIG. 4) of the heater unit 40 and the inner peripheral surface of the belt 35. When the heater unit 40 generates heat, the viscosity of the grease decreases. This ensures the slidability between the heater unit 40 and the belt 35.

The heat conduction member 49 is formed of a metal material having high heat conductivity such as copper. The outer shape of the heat conduction member 49 is the same as the outer shape of the substrate 41 of the heater unit 40. The heat conduction member 49 is disposed in contact with the surface of the heater unit 40 in the −z direction (second surface fb, see FIG. 4).

The support member 36 is formed of an elastic material such as silicone rubber or fluorine rubber, or a resin material such as polyimide resin, PPS (Polyphenylene Sulfide), PES (Polyether Sulfone), or liquid crystal polymer. The support member 36 is disposed so as to cover the sides of the heater unit 40 in the −z direction and the +x and −x directions. The support member 36 supports the heater unit 40 via the heat conduction member 49. Both ends of the support member 36 in the x direction are rounded. The support member 36 supports the inner circumferential surface of the belt 35 at both ends of the heater unit 40 in the x direction.

When the sheet S passing through the heating device 30 is heated, a temperature distribution occurs on the heater unit 40 according to the size of the sheet S. When the heater unit 40 is locally heated to a high temperature, the temperature may exceed the heat resistance temperature of the support member 36 formed of a resin material. The heat conduction member 49 averages the temperature distribution of the heater unit 40. This ensures heat resistance of the support member 36.

The stay 38 is formed of a steel plate material or the like. The cross section of the stay 38 perpendicular to the y direction is formed in a U shape. For example, the stay 38 is formed by bending a steel material having a plate thickness of 1 mm to 3 mm. As shown in FIG. 3, the stay 38 is attached to the support member 36 in the −z direction so that the opening of the U shape is closed by the support member 36. The stay 38 extends along the y direction. Both end portions of the stay 38 in the y direction are fixed to the housing of the image processing apparatus 1. Thus, the heating roller 102 is supported by the image processing apparatus 1. The stay 38 improves the bending rigidity of the heating roller 102. Flanges for restricting the movement of the belt 35 in the y direction are provided near both ends of the stay 38 in the y direction.

The heater thermometer 62 is disposed on the −z direction side of the heater unit 40 with the heat conduction member 49 interposed therebetween. For example, the heater thermometer 62 is a thermistor. The heater thermometer 62 is attached to and supported by the surface of the support member 36 in the −z direction. The temperature sensing element of the heater thermometer 62 passes through a hole penetrating the support member 36 along the z direction and comes into contact with the heat conduction member 49. The heater thermometer 62 measures the temperature of the heater unit 40 via the heat conduction member 49.

The thermostat 68 is disposed similarly to the heater thermometer 62. The thermostat 68 is incorporated in an electric circuit described later. When the temperature of the heater unit 40 detected via the heat conduction member 49 exceeds a predetermined temperature, the thermostat 68 cuts off energization to the first heating unit 45 and the second heating unit 120.

Figure 6:
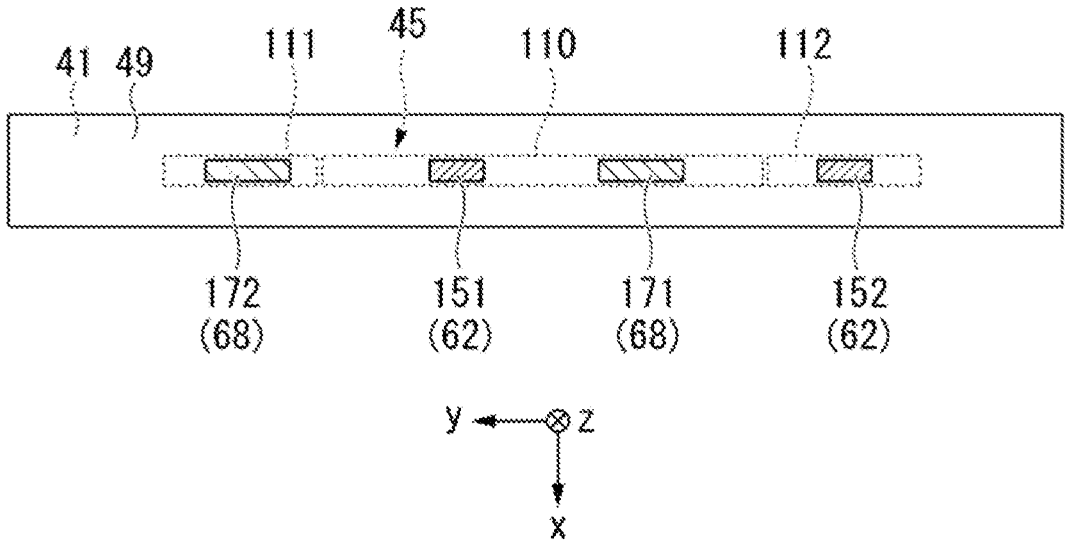
FIG. 6 is a plan view of a heater thermometer and a thermostat according to a first embodiment.

FIG. 6 is a plan view (viewed from the −z direction) of the heater thermometer 62 and the thermostat 68. In FIG. 6, illustration of the second heating unit 120 and the support member 36 is omitted. In the following description of the arrangement of the heater thermometer 62, the thermostat 68, and the film thermometer 64, the arrangement of the temperature sensing elements will be described.

A plurality of heater thermometers 62 including a central heater thermometer 151 and an end heater thermometer 152 are arranged side by side along the y direction. The plurality of heater thermometers 62 are disposed on the first heating unit 45. The plurality of heater thermometers 62 are disposed within the range of the first heating unit 45 in the y direction. The plurality of heater thermometers 62 are disposed at the center of the first heating unit 45 in the x direction. That is, when viewed from the z direction, the plurality of heater thermometers 62 and the first heating unit 45 at least partially overlap each other. The plurality of thermostats 68 (171, 172) are arranged in the same manner as the plurality of heater thermometers 62 described above.

The plurality of heater thermometers 62 include the central heater thermometer 151 and the end heater thermometer 152 disposed on one side thereof in the longitudinal direction.

The central heater thermometer 151 measures the temperature of the central heating element 110. The central heater thermometer 151 is disposed within the range of the central heating element 110 in each of the x and y directions. That is, when viewed from the z direction, the central heater thermometer 151 and the central heating element 110 overlap each other.

The end heater thermometer 152 measures the temperature of the second end heating element 112. As described above, the first end heating element 111 and the second end heating element 112 are similarly controlled to generate heat. Therefore, the temperature of the first end heating element 111 is equal to the temperature of the second end heating element 112. The end heater thermometer 152 is disposed within the second end heating element 112. That is, when viewed from the z direction, the end heater thermometer 152 and the second end heating element 112 overlap each other.

The plurality of thermostats 68 includes a central thermostat 171 and an end thermostat 172.

Figure 7:
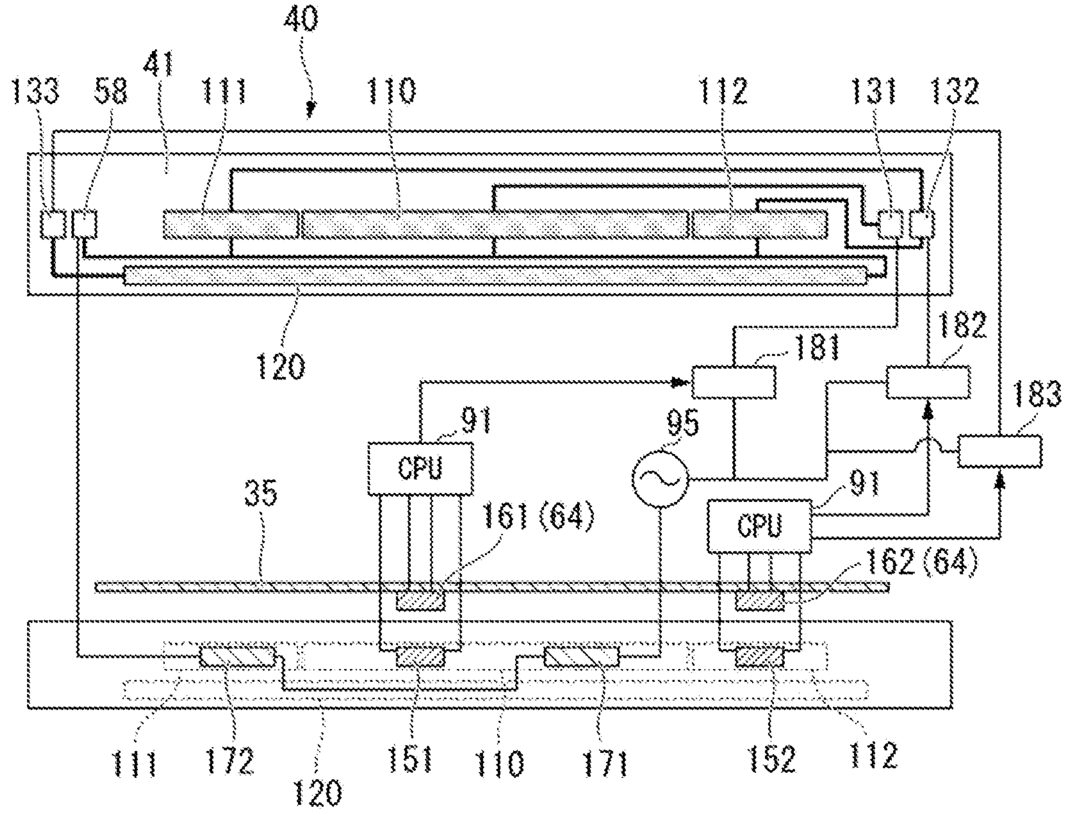
FIG. 7 is a schematic circuit diagram of a heating device according to a first embodiment.

When the temperature of central heating element 110 exceeds a predetermined temperature, the central thermostat 171 cuts off the energization to first heating unit 45 and second heating unit 120 (see FIG. 7). The central thermostat 171 is disposed within the central heating element 110. That is, when viewed from the z direction, the central thermostat 171 and the central heating element 110 overlap each other.

When the temperature of the first end heating element 111 exceeds a predetermined temperature, the end thermostat 172 cuts off energization to the first heating unit 45 and the second heating unit 120 (see FIG. 7). As described above, the first end heating element 111 and the second end heating element 112 are similarly controlled to generate heat. Therefore, the temperature of the first end heating element 111 is equal to the temperature of the second end heating element 112. The end thermostat 172 is disposed within the first end heating element 111. That is, when viewed from the z direction, the end thermostat 172 and the first end heating element 111 overlap each other.

As described above, the central heater thermometer 151 and the central thermostat 171 are disposed on the central heating element 110. Thus, the temperature of the central heating element 110 is measured. When the temperature of central heating element 110 exceeds the predetermined temperature, energization to first heating unit 45 and second heating unit 120 (see FIG. 7) is cut off. The end heater thermometer 152 is disposed on the second end heating element 112. Thus, the temperature of the second end heating element 112 is measured. Since the temperature of the first end heating element 111 is equal to the temperature of the second end heating element 112, the temperatures of the first end heating element 111 and the second end heating element 112 are measured. The end thermostat 172 is disposed on the first end heating element 111. When the temperatures of the first end heating element 111 and the second end heating element 112 exceed a predetermined temperature, energization to the first heating unit 45 and the second heating unit 120 (see FIG. 7) is cut off.

The plurality of heater thermometers 62 and the plurality of thermostats 68 are alternately arranged along the y direction. As described above, the first end heating element 111 is disposed on the +y direction side of the central heating element 110. The end thermostat 172 is disposed within the first end heating element 111. The central heater thermometer 151 is disposed on the +y direction side of the center of the central heating element 110. The central thermostat 171 is disposed on the −y direction side of the center of the central heating element 110. As described above, the second end heating element 112 is disposed on the −y direction side of the central heating element 110. An end heater thermometer 152 is disposed within the range of the second end heating element 112. Thus, the end portion thermostat 172, the central portion heater thermometer 151, the central portion thermostat 171, and the end portion heater thermometer 152 are arranged in this order from the +y direction to the −y direction.

In general, the thermostat 68 connects and disconnects an electric circuit by utilizing bending deformation of a bimetal caused by a temperature change. The thermostat is formed long and narrow in accordance with the shape of the bimetal. Terminals extend outward from both ends of the thermostat 68 along the longitudinal direction. A connector of external wiring is connected to the terminal by caulking. Therefore, it is necessary to secure a space outside the thermostat 68 in the longitudinal direction. Since there is no spatial margin in the x direction in the heating device 30, the longitudinal direction of the thermostat 68 is arranged along the y direction. At this time, if the plurality of thermostats 68 are arranged adjacent to each other along the y direction, it becomes difficult to secure a connection space for external wiring.

As described above, the plurality of heater thermometers 62 and the plurality of thermostats 68 are alternately arranged along the y direction. Thus, the heater thermometer 62 is disposed adjacent to the thermostat 68 in the y direction. Therefore, it is possible to secure a space for connecting external wiring to the thermostat 68. In addition, the degree of freedom of the layout of the thermostat 68 and the heater thermometer 62 in the y direction is increased. Thus, the temperature of the heating device 30 can be controlled by arranging the thermostat 68 and the heater thermometer 62 at optimum positions. Furthermore, the alternating-current wiring connected to the plurality of thermostats 68 and the direct-current wiring connected to the plurality of heater thermometers 62 can be easily separated from each other. This suppresses generation of noise in the electric circuit.

As shown in FIG. 3, the film thermometer 64 is disposed inside the belt 35 and on the +x direction side of the heater unit 40. The film thermometer 64 is in contact with the inner peripheral surface of the belt 35 and measures the temperature of the belt 35.

FIG. 7 is an electric circuit diagram of the heating device 30. In FIG. 7, the bottom view of FIG. 5 is shown on the upper side, and the plan view of FIG. 6 is shown on the lower side. In FIG. 7, the cross section of the belt 35 and a plurality of belt thermometers 64 are shown in the upper part of the lower plan view. The plurality of belt thermometers 64 include a central belt thermometer 161 and end belt thermometers 162 disposed on one side thereof in the longitudinal direction.

The central belt thermometer 161 is in contact with the central portion of the belt 35 in the y direction. The central belt thermometer 161 contacts the belt 35 within the range of the central heating element 110 in the y direction. The central belt thermometer 161 measures the temperature of the central portion of the belt 35 in the y direction.

The end belt thermometer 162 is in contact with the end of the belt 35 in the −y direction. The end belt thermometer 162 contacts the belt 35 within the range of the second end heating element 112 in the y direction. The end belt thermometer 162 measures the temperature of the end portion of the belt 35 in the −y direction. As described above, the first end heating element 111 and the second end heating element 112 are similarly controlled to generate heat. Therefore, the temperature of the end portion of the belt 35 in the −y direction is equal to the temperature of the end portion of the belt 35 in the +y direction.

A power supply 95 is connected to the central contact 131 via a central triac 181. The power supply 95 is connected to an end contact 132 via an end triac 182. The power supply 95 is connected to the auxiliary contact 133 via an auxiliary triac 183. The CPU 91 controls ON/OFF of the central triac 181, the end triac 182, and the auxiliary triac 183 independently of each other. When the CPU 91 turns on the central triac 181, the central heating element 110 is energized from the power supply 95. As a result, the element 110 generates heat. When the CPU 91 turns on the end triac 182, the first end heating element 111 and the second end heating element 112 are energized from the power supply 95. Thus, the first end heating element 111 and the second end heating element 112 generate heat. When the CPU 91 turns on the auxiliary triac 183, the second heating unit 120 is energized from the power supply 95. As a result, the second heating unit 120 generates heat. As described above, the heat generation of the central heating element 110, the first end heating element 111, the second end heating element 112, and the second heating unit 120 is controlled independently of each other. The central heating element 110, the first end heating element 111, the second end heating element 112, and the second heating unit 120 are connected in parallel to the power supply 95.

The power supply 95 is connected to the common contact 58 via the central thermostat 171 and the end thermostat 172. The central thermostat 171 and the end thermostat 172 are connected in series. When the temperature of the central heating element 110 abnormally rises, the temperature detected by the central thermostat 171 exceeds a predetermined temperature. During this time, the central portion thermostat 171 cuts off energization from power supply 95 to the entire first heating unit 45 and the second heating unit 120.

When the temperature of the first end heating element 111 abnormally increases, the temperature detected by the end thermostat 172 exceeds a predetermined temperature. During this time, the end thermostat 172 cuts off the energization from the power supply 95 to the entire first heating unit 45 and the second heating unit 120. As described above, the first end heating element 111 and the second end heating element 112 are similarly controlled to generate heat. Therefore, when the temperature of the second end heating element 112 rises abnormally, the temperature of the first end heating element 111 also increases. Therefore, even when the temperature of the second end heating element 112 abnormally rises, similarly, the end thermostat 172 controls the power supply 95 to supply power to the entire first heating unit 45 and the second heating unit 120.

The CPU 91 of the control unit 6 acquires the temperature of the central heating element 110 by the central heater thermometer 151. The CPU 91 acquires the temperature of the second end heating element 112 with the end heater thermometer 152. The temperature of the second end heating element 112 is equal to the temperature of the first end heating element 111. The CPU 91 acquires the temperature of the first heating unit 45 by the heater thermometer 62 when the heating device 30 is started. When the temperature of the first heating unit 45 is lower than the predetermined temperature, the CPU 91 causes the first heating unit 45 to generate heat for a short time. Thereafter, the CPU 91 starts rotation of the pressure roller 101. The viscosity of the grease applied to the inner peripheral surface of the belt 35 decreases due to the heat generation of the first heating unit 45. This ensures the slidability between the heater unit 40 and the belt 35 at the start of rotation of the pressure roller 101.

The CPU 91 acquires the temperature of the center portion of the belt 35 in the y direction by the central portion belt thermometer 161. The CPU 91 acquires the temperature of the end portion of the belt 35 in the −y direction by the end belt thermometer 162. The temperature of the end portion of the belt 35 in the −y direction is equal to the temperature of the end portion of the belt 35 in the +y direction. The CPU 91 acquires the temperature of the center portion and the end portion of the belt 35 in the y direction during the operation of the heating device 30. The CPU 91 controls the phase or the wave number of the power supplied to the first heating unit 45 by the central triac 181 and the end triac 182. The CPU 91 controls energization to the central heating element 110 based on the temperature measurement result of the central portion of the belt 35 in the y direction.

Next, an example of control of the heater unit 40 will be described. When the CPU 91 of the controller 6 increases the temperature of the heater unit 40 to a temperature at which the image formed by the image forming unit 3 can be fixed to the sheet S, the CPU 91 controls to increase the temperature of the first heating unit 45 and the second heating unit 120. Hereinafter, a time period during which the temperature of the heater unit 40 is increased to a temperature at which the image formed by the image forming unit 3 can be fixed to the sheet S is also referred to as a "start-up time". For example, the start-up time includes a start-up time or warming-up time of the heating device 30 and a return time from a paused (idle) state or sleep state. The CPU 91 causes the entire first heating unit 45 and the second heating unit 120 to generate heat during the start-up time. Accordingly, it is possible to avoid an excessive decrease in temperature of the end portion in the longitudinal direction of the belt 35 during the start-up time.

The CPU 91 controls heating of the first heating unit 45 when the image formed by the image forming unit 3 is fixed to the sheet S. The CPU 91 does not cause the second heating unit 120 to generate heat when the image formed by the image forming unit 3 is fixed to the sheet S. Hereinafter, a time period during which the image formed by the image forming unit 3 is fixed to the sheet S is also referred to as "fixing time". For example, the fixing time includes a time period during which the sheet S is continuously conveyed. In other words, fixing is performed during printing. The CPU 91 causes the entire first heating unit 45 to generate heat during the fixing time. The CPU 91 does not cause the second heating unit 120 to generate heat during the fixing time. Thus, excessive temperature rise of the longitudinal end portion of the belt 35 can be suppressed during the fixing time.

Next, another example of the control of the heater unit 40 will be described. The CPU 91 controls heating of the first heating unit 45 and the second heating unit 120 regardless of the size of the sheet in the start-up time. The CPU 91 causes the entire first heating unit 45 and the second heating unit 120 to generate heat regardless of the size of sheet S.

The CPU 91 controls heating of the first heating unit 45 and the second heating unit 120 based on the size of the sheet S during the fixing time. For example, when the length of the sheet S in the y direction is equal to or less than 297 mm, the CPU 91 causes the entire first heating unit 45 to generate heat during the fixing time. For example, when the length of the sheet S in the y direction is less than or equal to 297 mm, the CPU 91 does not cause the second heating unit 120 to generate heat during the fixing time. For example, when the length of the sheet S in the y direction exceeds 297 mm, the CPU 91 causes the entire first heating unit 45 and the second heating unit 120 to generate heat during the fixing time. For example, the CPU 91 may control heating of the second heating unit 120 only when the length of the sheet S in the y direction exceeds 297 mm.

As described above, during the start-up time, the entire first heating unit 45 and the second heating unit 120 generate heat regardless of the size of the sheet S. Therefore, during the start-up time, it is possible to suppress an excessive decrease in the temperature of the end portion in the longitudinal direction of the belt 35 regardless of the size of the sheet S. Additionally, during the fixing time, when the length of the sheet S in the y direction is equal to or less than 297 mm, the entire first heating unit 45 generates heat, but the second heating unit 120 does not generate heat. Therefore, during the fixing time, it is possible to avoid an excessive temperature rise of the end portion in the longitudinal direction of the belt 35 (e.g., the portion for which the length in the y direction exceeds 297 mm).

Figure 8:
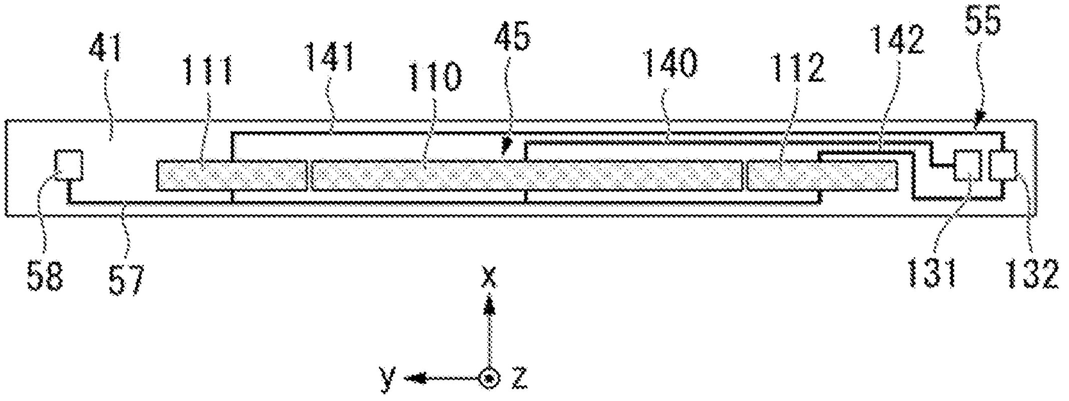
FIG. 8 is a bottom view of a heater unit of a comparative example.

Next, a heater unit of a comparative example will be described with reference to FIG. 8. FIG. 8 is a bottom view of a heater unit of a comparative example. In the comparative example, the heater unit includes a substrate 41, a plurality of heating elements 110, 111, and 112, a plurality of contact points 131, 132, 58, and a plurality of wirings 140, 141, 142, 57. In the comparative example, the heater unit does not include the second heating unit 120, the auxiliary contact 133, and the auxiliary wiring 143.

Figure 9:
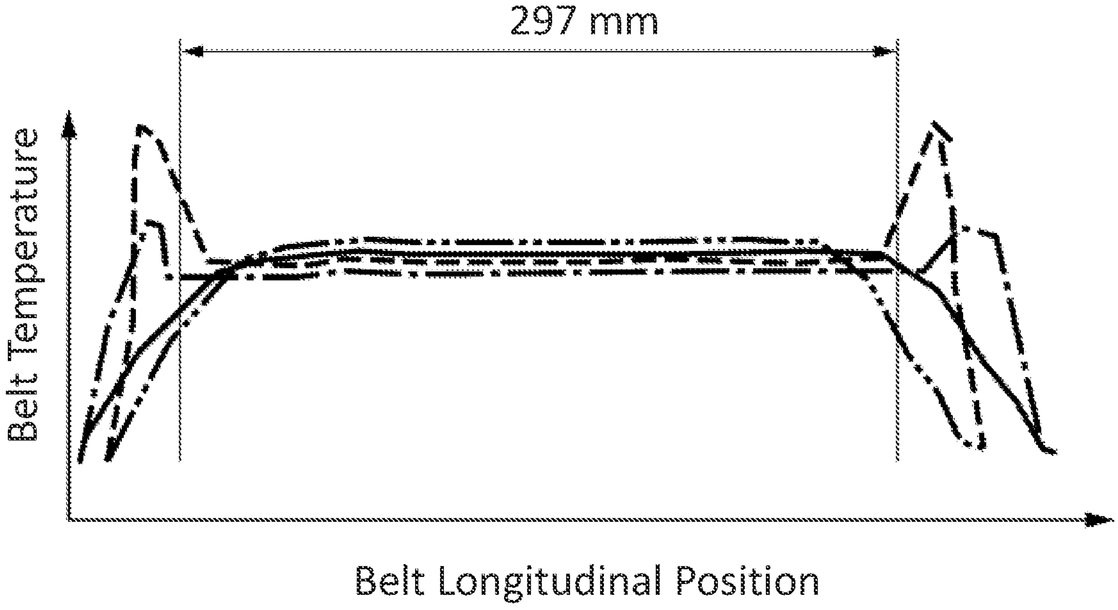
FIG. 9 is a diagram for explaining temperature distributions of belts according to a first embodiment and a comparative example.

Next, effects of a first embodiment will be described together with the comparative example with reference to FIG. 9. FIG. 9 is an explanatory diagram of the temperature distribution of the belt according to a first embodiment and the comparative example. In the FIG. 9, the horizontal axis represents the belt longitudinal position (that is, the position along the longitudinal direction of the belt 35), and the vertical axis represents the belt temperature (that is, the temperature of the belt 35). In FIG. 9, a solid line represents values during the start-up time in a first embodiment, a one-dot chain line indicates values during the fixing time in the first embodiment, a two-dot chain line indicates values during the start-up time in the comparative example, and a broken (dashed) line indicates a values during the fixing time in the comparative example.

As described above, in the comparative example, since the second heating unit 120 is not provided, the belt temperature decreases at the end portion of the belt longitudinal position during the start-up time, as indicated by the two-dot chain line in FIG. 9. In order to suppress the temperature decrease at the end portion of the belt longitudinal position, the heating element may be enlarged in the longitudinal direction. However, if the heating element is simply increased in size in the longitudinal direction, the temperature of the belt at the non-sheet passing portion (e.g., the end portion of the belt longitudinal position) increases during the fixing time, as indicated by the broken line in FIG. 9.

In first embodiment, the first heating unit 45 and the second heating unit 120 are provided. In the start-up time, the entire first heating unit 45 and the second heating unit 120 generate heat regardless of the size of the sheet S. Therefore, it is possible to suppress the temperature decrease of the end portion of the belt longitudinal position during the start-up time, as indicated by the solid line in FIG. 9. Further, during the fixing time, when the length of the sheet S in the y direction is equal to or less than 297 mm, the entire first heating unit 45 generates heat, but the second heating unit 120 does not generate heat. For this reason, it is possible to suppress a temperature rise of an end portion (e.g., a portion outside the range of 297 mm) of the belt longitudinal position at the time of fixing, as indicated by the alternate long and short dash line in FIG. 9.

As described above, the image processing apparatus 1 includes the image forming unit 3, the belt 35, the heating unit 40, and the controller 6. The image forming unit 3 forms an image on the sheet S. The belt 35 has a cylindrical shape. The heating unit 40 is provided inside the belt 35. The heating unit 40 includes the first heating unit 45 and the second heating unit 120 facing the inner circumferential surface of the belt 35. The heating unit 40 heats the belt 35. The controller 6 controls the first heating unit 45 and the second heating unit 120 to generate heat when the temperature of the heating unit 40 is increased to a temperature at which the image formed by the image forming unit 3 can be fixed to the sheet S. When the image formed by the image forming unit 3 is fixed to the sheet S, the controller 6 controls the first heating unit 45 to generate heat and controls the second heating unit 120 to not generate heat. With the above configuration, the following effects are achieved. When the temperature of the heating unit 40 is increased to a temperature at which the image formed by the image forming unit 3 can be fixed to the sheet S, the first heating unit 45 and the second heating unit 120 generate heat, and thus it is possible to suppress a local decrease in the temperature of the belt 35. When the image formed by the image forming unit 3 is fixed to the sheet S, the first heating unit 45 generates heat, but the second heating unit 120 does not generate heat. Therefore, it is possible to suppress a local temperature rise of the belt 35. Therefore, the local temperature drop and temperature rise of the belt 35 can be suppressed.

The first heating unit 45 generates heat in the first region Ea. The second heating unit 120 generates heat in a region including a second region Eb outside the first heating unit 45 along the longitudinal direction orthogonal to the conveyance direction of the sheet S. With the above configuration, the following effects are achieved. In a case where the temperature of the heating unit 40 is increased to a temperature at which the image formed by the image forming unit 3 can be fixed to the sheet S, the first heating unit 45 and the second heating unit 120 generate heat, and thus an excessive decrease in the temperature of the end portion of the belt 35 in the longitudinal direction can be suppressed. When the image formed by the image forming unit 3 is fixed to the sheet S, the first heating unit 45 generates heat, but the second heating unit 120 does not generate heat. Therefore, it is possible to suppress an excessive temperature rise of the end portion in the longitudinal direction of the belt 35. Therefore, local temperature decrease and temperature increase of the belt 35 can be suppressed.

The second heating unit 120 generates heat in the first region Ea and the second region Eb. With the above configuration, the following effects are achieved. If the heating unit 40 is raised to a temperature at which the image formed by the image forming unit 3 can be fixed to the sheet S, then the first region Ea can be heated by the first heating unit 45 and the second heating unit 120. This contributes to shortening of the start-up time.

The first heating unit 45 has a plurality of heating elements 110, 111, and 112 along the longitudinal direction. With the above configuration, the following effects are achieved. Corresponding to various paper sizes, the heating temperature can be appropriately controlled.

The image processing apparatus 1 further includes the heat conduction member 49 provided in contact with the heating unit 40. With the above configuration, the following effects are achieved. The temperature gradient in the longitudinal direction of the heating unit 40 is reduced, and local temperature drop and temperature rise in the longitudinal direction can be suppressed.

A temperature coefficient of resistance of the second heating unit 120 is smaller than a temperature coefficient of resistance of the first heating unit 45. With the above configuration, the following effects are achieved. When the temperature of the heating unit 40 is increased, the output decrease of the electric power of the second heating unit 120 is smaller than the output decrease of the electric power of the first heating unit 45. Therefore, it is possible to shorten the time required for heating during the start-up of the heating device 30.

Next, a second embodiment will be described with reference to FIG. 10. In the second embodiment, description of the same configuration as those of the first embodiment will be omitted. The second embodiment is different from the first embodiment in that the second heating unit generates heat in the second region Eb but does not generate heat in the first region Ea.

Figure 10:
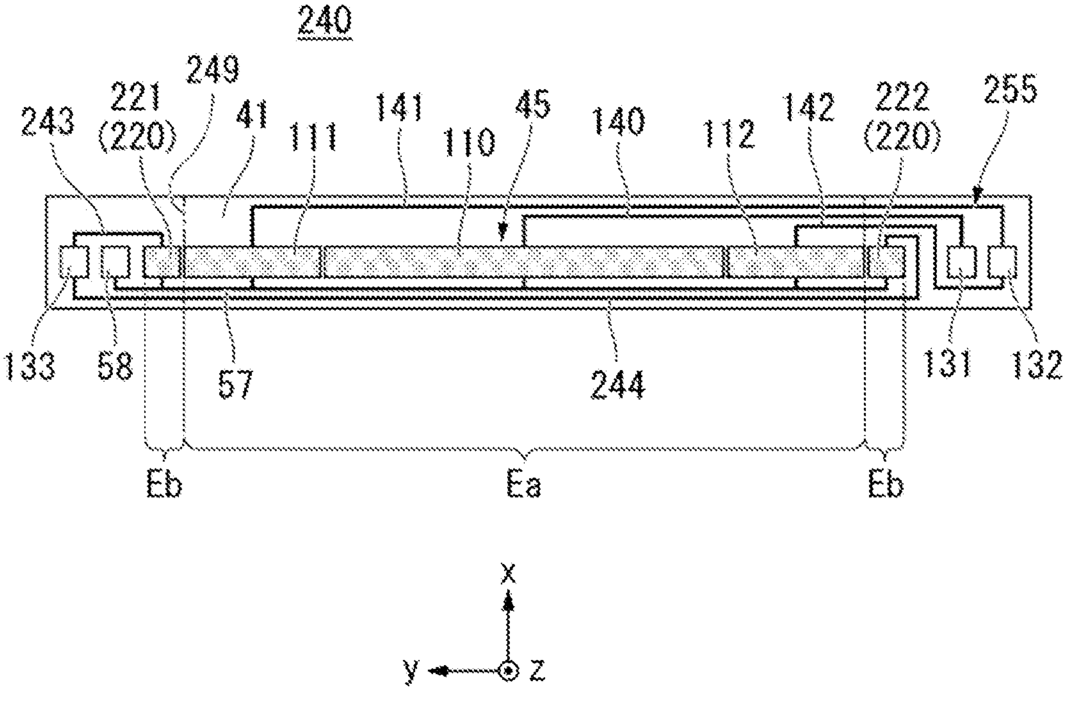
FIG. 10 is a bottom view of a heater unit of a second embodiment.

FIG. 10 is a bottom view of a heater unit 240 of the second embodiment. As shown in FIG. 10, the heater unit 240 includes a substrate 41, a first heating unit 45, a second heating unit 220, and a wiring set 255.

The first heating unit 45 includes a plurality of heating elements 111, 110, and 112 provided along the y direction. The first heating unit 45 includes a first end heating element 111, a central heating element 110, and a second end heating element 112 arranged along the y direction.

The second heating unit 220 is disposed outside the first heating unit 45 along the longitudinal direction. The second heating unit 220 generates heat in the second region Eb outside the first heating unit 45 along the y direction. The second heating unit 220 includes a first auxiliary heating element 221 disposed on the +y direction side of the first end heating element 111, and a second auxiliary heating element 222 disposed on the −y direction side of the second end heating element 112.

For example, each of the first auxiliary heating element 221 and the second auxiliary heating element 222 may be provided with a thermometer such as a thermistor. For example, the CPU 91 may control heating of the first auxiliary heating element 221 and the second auxiliary heating element 222 based on the detection results of the thermistors. For example, the first heating unit 45, the first auxiliary heating element 221, and the second auxiliary heating element 222 may be controlled to generate heat independently of each other. The first auxiliary heating element 221 and the second auxiliary heating element 222 may be controlled to generate heat in the same manner. Thus, the belt temperature at the belt longitudinal position can be controlled finely.

The wiring set 255 includes a central contact 131, a central wiring 140, an end contact 132, a first end wiring 141, a second end wiring 142, an auxiliary contact 133, a first auxiliary wiring 243, a second auxiliary wiring 244, a common contact 58, and a common wiring 57.

The first auxiliary wiring 243 connects an end portion of the first auxiliary heating element 221 in the +x direction and an end portion of the auxiliary contact 133 in the +x direction. The second auxiliary wiring 244 is provided between the end portion of the second auxiliary heating element 222 in the +x direction and the auxiliary contact 133 in the −x direction. The common wiring 57 connects end sides in the −x direction of the central heating element 110, the first end heating element 111, and the second end heating element 112, end portions in the −x direction of the first auxiliary heating element 221 and the second auxiliary heating element 222, and the common contact 58.

A heat conduction member 249 corresponding to the heat conduction member 49 shown in FIG. 3 and indicated by the dashed line in FIG. 10 is in contact with the first heating 45 and is not in contact with the second heating unit 220. The heat conduction member 249 overlaps with the first heating unit 45 when viewed from the z direction. The heat conduction member 249 does not overlap with the second heating unit 220 when viewed from the z direction. The length of the heat conduction member 249 in the x direction is equal to the length of the substrate 41 in the x direction. The length of the heat conduction member 249 in the y direction is equal to the length of the first heating unit 45.

Next, an example of control of the heater unit 240 will be described. The CPU 91 causes the entire first heating unit 45 and the second heating unit 220 to generate heat during the start-up time. Accordingly, it is possible to suppress an excessive decrease in temperature of the end portion in the longitudinal direction of the belt 35 during the start-up time.

The CPU 91 causes the entire first heating unit 45 to generate heat during the fixing time. The CPU 91 does not cause the second heating unit 220 to generate heat during the fixing time. Thus, excessive temperature rise of the longitudinal end portion of the belt 35 can be suppressed during the fixing time.

Next, another example of control of the heater unit 240 will be described. The CPU 91 causes the entire first heating unit 45 and the second heating unit 220 to generate heat regardless of the size of the sheet S during the start-up time.

The CPU 91 controls heating of the first heating unit 45 and the second heating unit 220 based on the size of the sheet S during the fixing time. For example, when the length of the sheet S in the y direction is equal to or less than 297 mm, the CPU 91 causes the entire first heating unit 45 to generate heat during the fixing time. For example, when the length of the sheet S in the y direction is less than or equal to 297 mm, the CPU 91 does not cause the second heating unit 220 to generate heat during the fixing time. For example, when the length of the sheet S in the y direction exceeds 297 mm, the CPU 91 causes the entire first heating unit 45 and the second heating unit 220 to generate heat during the fixing time. For example, the CPU 91 may control heating of the second heating unit 220 only when the length of the sheet S in the y direction exceeds 297 mm.

As described above, during the start-up time, the entire first heating unit 45 and the second heating unit 220 generate heat regardless of the size of the sheet S. Therefore, during the start-up time, it is possible to suppress an excessive decrease in the temperature of the end portion in the longitudinal direction of the belt 35 regardless of the size of the sheet S. Further, during the fixing time, when the length of the sheet S in the y direction is equal to or less than 297 mm, the entire first heating unit 45 generates heat, but the second heating unit 220 does not generate heat. Therefore, during the fixing time, it is possible to suppress an excessive temperature rise of the end portion in the longitudinal direction of the belt 35 (e.g., the portion where the length in the y direction exceeds 297 mm). Since a local temperature increase in the longitudinal direction does not occur, the heat conduction member 249 may not be disposed at a position corresponding to the second heating unit 220 as described above.

As described above, the second heating unit 220 is disposed outside the first heating unit 45 along the longitudinal direction. The second heating unit 220 generates heat in the second region Eb. With the above configuration, the following effects are achieved. By providing the thermistor in the second heating unit 220, it is possible to control heating of the first heating unit 45 and the second heating unit 220 independently of each other. Therefore, the belt temperature at the belt longitudinal position can be controlled more finely than in the first embodiment.

As described above, the heat conduction member 249 is in contact with the first heating unit 45. The heat conduction member 249 is not in contact with the second heating unit 220. With the above configuration, the following effects are achieved. The power input to the second heating unit 220 can be reduced, and this contributes to energy saving.

Next, a modification of the aforementioned embodiments will be described. The first heating unit 45 and the second heating unit 120 or 220 described above generate heat in regions different from each other. However, in some examples, the first heating unit 45 and the second heating unit 120, 220 may generate heat in the same region. The first heating unit 45 and the second heating unit 120, 220 may be controlled in such examples to be heated at different timings regardless of whether the heating regions are the same or different.

The image processing apparatus 1 includes a heat conduction member 49 (or 249) provided in contact with the heating unit 40 (or 240). However, in other examples, the image processing apparatus 1 need not include the heat conductive member 49 (or 249). In such a case, the heater thermometer 62 and the thermostat 68 may directly measure the temperature of the heater unit 40 (or 240).

The temperature coefficient of resistance of the second heating unit 120 (or 220) in the above-described embodiments is smaller than the temperature coefficient of resistance of the first heating unit 45. However, in some examples, the temperature coefficient of resistance of the second heating unit 120 (or 220) may be larger than the temperature coefficient of resistance of the first heating unit 45.

The temperature coefficient of resistance of the first heating unit 45 and the temperature coefficient of resistance of the second heating unit 120 (or 220) of the above-described embodiments are different from each other. However, in some examples, the temperature coefficient of resistance of the first heating unit 45 and the temperature coefficient of resistance of the second heating unit 120 (or 220) may be equal to each other.

The first heating unit 45 of the above-described embodiments includes three heating elements (e.g., a central heating element 110, a first end heating element 111, and a second end heating element 112). In other examples, the number of heating elements included in the first heating unit 45 may be one, two, or four or more. The plurality of heater thermometers 62 of the above-described embodiments include two heater thermometers (e.g., the central heater thermometer 151 and the end heater thermometer 152). However, the number of heater thermometers 62 may be three or more in some examples. The plurality of thermostats 68 of the above-described embodiments includes two thermostats (e.g., the central thermostat 171 and the end thermostat 172). However, the number of thermostats 68 may be three or more in some examples.

The second heating unit 120 of the first embodiment is formed as a single heating element extending along the y direction. On the other hand, in other examples, the second heating unit 120 may be formed as a plurality of heating elements. The second heating unit 220 of the second embodiment includes a first auxiliary heating element 221 disposed on the +y direction side of the first heating unit 45 and a second auxiliary heating element 222 disposed on the −y direction side of the first heating unit 45. In other examples, the second heating unit 220 may be disposed on one side of the first heating unit 45 in the y direction but not disposed on the other side thereof in the y direction. The number of heating elements disposed on at least one side of the first heating unit 45 in the y direction may be more than one.

In an embodiment, the image processing apparatus 1 may be a decoloring apparatus, and the heating apparatus included therein may be a decoloring unit. The decoloring device performs a process of decoloring or erasing an image that has been formed on the sheet S with decolorable toner. The decoloring unit heats and decolors the decolorable toner image formed on the sheet passing through the nip N.

According to at least one embodiment described above, the controller 6 performs heating control of the first heating unit 45 and the second heating unit 120 when the temperature of the heating unit 40 is being increased to a temperature at which an image formed by the image forming unit 3 can be fixed to the sheet S. When the image formed by the image forming unit 3 is fixed to the sheet S, the controller 6 controls the first heating unit 45 to generate heat and controls the second heating unit 120 to not generate hat. As a result, local temperature variations across the belt 35 can be suppressed.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A heating device, comprising:

a cylindrical belt to be rotated around an axis that extends in an axial direction;

a heater unit contacting the cylindrical belt and including a first heating element, a plurality of second heating elements, and a plurality of third heating elements, that are aligned on a substrate in the axial direction, wherein the first heating element extends over a center of the substrate in the axial direction, the plurality of second heating elements are provided outer than outer ends of the first heating element in the axial direction, and the plurality of third heating elements are provided outer than outer ends of the second heating elements in the axial direction; and a controller configured to control the first heating element, the plurality of second heating elements, and the plurality of third heating elements, wherein before a medium is conveyed to the cylindrical belt to be heated, the controller controls the first heating element, the plurality of second heating elements, and the plurality of third heating elements to generate heat to reach an image fixing temperature, when the medium is heated through the cylindrical belt, the controller controls the first heating element and the plurality of second heating elements to generate heat and the plurality of third heating elements to not generate heat, a length of each of the second heating elements in the axial direction is less than a length of the first heating element in the axial direction, and a length of each of the third heating elements in the axial direction is less than the length of each of the second heating elements in the axial direction.

2. The heating device according to claim 1, wherein the first heating element and the plurality of second heating elements generate heat in a first region of the cylindrical belt at a center thereof in the axial direction, and the plurality of third heating elements generate heat in a second region of the cylindrical belt outer than the first region in the axial direction.

3. The heating device according to claim 1, wherein the first heating element, the plurality of second heating elements, and the plurality of third heating elements are aligned in parallel to a side of the substrate.

4. The heating device according to claim 1, further comprising:

a heat conduction member in contact with the heater.

5. The heating device according to claim 4, wherein the heat conduction member overlaps with the first heating element when viewed from a second direction perpendicular to the substrate.

6. The heating device according to claim 5, wherein the heat conduction member further overlaps with the plurality of second heating elements but does not overlap with the plurality of third heating elements when viewed from the second direction.

7. The heating device according to claim 1, wherein a resistance temperature coefficient of the first heating element is different from a resistance temperature coefficient of the third heating elements.

8. The heating device according to claim 7, wherein the resistance temperature coefficient of the third heating elements is less than the resistance temperature coefficient of the first heating element.

9. The heating device according to claim 1, wherein the first heating element is electrically connected to a first power supply terminal, the second heating elements are electrically connected to a second power supply terminal, and the third heating elements are electrically connected to a third power supply terminal.

10. The heating device according to claim 9, further comprising:

a first switching element configured to turn on and off power supply to the first power supply terminal;

a second switching element configured to turn on and off power supply to the second power supply terminal; and a third switching element configured to turn on and off power supply to the third power supply terminal.

11. The heating device according to claim 9, wherein the first heating element, the plurality of second heating elements, and the plurality of third heating elements are electrically connected in common to a common terminal.

12. A fixing device for fixing an image to a sheet, comprising:

a cylindrical belt that contacts a sheet and is to be rotated around an axis that extends in an axial direction;

a heater unit contacting the cylindrical belt and including a first heating element, a plurality of second heating elements, and a plurality of third heating elements, that are aligned on a substrate in the axial direction, wherein the first heating element extends over a center of the substrate in the axial direction, the plurality of second heating elements are provided outer than outer ends of the first heating elements in the axial direction, and, and the plurality of third heating elements are provide outer than outer ends of the second heating elements in the axial direction; and a controller configured to control the first heating element, the plurality of second heating elements, and the plurality of third heating elements, wherein before the sheet is conveyed to the cylindrical belt to be heated, the controller controls the first heating element, the plurality of second heating elements, and the plurality of third heating elements to generate heat to reach an image fixing temperature, when the sheet is heated through the cylindrical belt, the controller controls the first heating element and the plurality of second heating elements to generate heat and the plurality of third heating elements to not generate heat, the first heating element and the plurality of second heating elements generate heat in a first region of the cylindrical belt at a center thereof in the axial direction, the plurality of third heating elements generate heat in a second region of the cylindrical belt outer than the first region in the axial direction, a length of each of the second heating elements in the axial direction is less than a length of the first heating element in the axial direction, and a length of each of the third heating elements in the axial direction is less than the length of each of the second heating elements in the axial direction.

13. The fixing device according to claim 12, wherein an image is formed on the sheet with a toner.

14. A heating device, comprising:

a cylindrical belt to be rotated around an axis that extends in an axial direction;

a heater unit contacting the cylindrical belt and including a first heating element, a plurality of second heating elements, and a plurality of third heating elements, that are aligned on a substrate in the axial direction, wherein the first heating element extends over a center of the substrate in the axial direction, the plurality of second heating elements are provided outer than outer ends of the first heating element in the axial direction, and the plurality of third heating elements are provided outer than outer ends of the second heating elements in the axial direction; and a controller configured to control the first heating element, the plurality of second heating elements, and the plurality of third heating elements, wherein before a medium is conveyed to the cylindrical belt to be heated, the controller controls the first heating element, the plurality of second heating elements, and the plurality of third heating elements to generate heat to reach an image fixing temperature, when the medium is heated through the cylindrical belt, the controller controls the first heating element and the plurality of second heating elements to generate heat and the plurality of third heating elements to not generate heat, and a resistance temperature coefficient of the first heating element is different from a resistance temperature coefficient of the third heating elements.

15. The heating device according to claim 14, wherein the first heating element and the plurality of second heating elements generate heat in a first region of the cylindrical belt at a center thereof in the axial direction, and the plurality of third heating elements generate heat in a second region of the cylindrical belt outer than the first region in the axial direction.

16. The heating device according to claim 14, wherein the first heating element, the plurality of second heating elements, and the plurality of third heating elements are aligned in parallel to a side of the substrate.

17. The heating device according to claim 14, further comprising:

a heat conduction member in contact with the heater.

18. The heating device according to claim 17, wherein the heat conduction member overlaps with the first heating element when viewed from a second direction perpendicular to the substrate.

19. The heating device according to claim 18, wherein the heat conduction member further overlaps with the plurality of second heating elements but does not overlap with the plurality of third heating elements when viewed from the second direction.

20. The heating device according to claim 14, wherein the resistance temperature coefficient of the third heating elements is less than the resistance temperature coefficient of the first heating element.

* * * * *